United States Patent [19]

Conti

[11] Patent Number: 4,555,039
[45] Date of Patent: Nov. 26, 1985

[54] PILFER-PROOF CAP

[75] Inventor: Vincent N. Conti, West Hempstead, N.Y.

[73] Assignee: American Safety Closure Corp., Farmingdale, N.Y.

[21] Appl. No.: 397,761

[22] Filed: Jul. 13, 1982

[51] Int. Cl.⁴ .............................................. B65D 41/34
[52] U.S. Cl. ..................................................... 215/252
[58] Field of Search ........................................ 215/252

[56] References Cited

U.S. PATENT DOCUMENTS

| | | | |
|---|---|---|---|
| 3,929,246 | 12/1975 | Leitz | 215/252 |
| 4,147,268 | 4/1979 | Patel et al. | 215/252 |
| 4,196,818 | 4/1980 | Brownbill | 215/252 |
| 4,241,841 | 12/1980 | Boller | 215/252 |
| 4,299,328 | 11/1981 | Ochs et al. | 215/252 |
| 4,322,012 | 3/1982 | Conti | 215/344 |
| 4,343,408 | 8/1982 | Csaszar | 215/258 |
| 4,346,811 | 8/1982 | Hilaire | 215/252 |
| 4,461,390 | 7/1984 | Csaszar | 215/252 |

FOREIGN PATENT DOCUMENTS

| | | | |
|---|---|---|---|
| 4500 | 10/1979 | European Pat. Off. | 215/252 |
| 2356007 | 5/1974 | Fed. Rep. of Germany | 215/252 |

*Primary Examiner*—Donald F. Norton
*Attorney, Agent, or Firm*—Pennie & Edmonds

[57] ABSTRACT

A molded plastic pilfer-proof closure constructed to permit removal from the internal molding die on which it is formed without damage to the closure. The closure includes a threaded skirt portion extending downwardly from the top wall of the closure and a pilfer-proof ring member attached to the lower end of the skirt. The ring includes an inwardly directed protrusion which is connected to the skirt by frangible members. The frangible members are located in axial alignment with the skirt and ring portions of the closure so that during removal of the closure from the internal mold member on which it is formed by a pushing action, compressive forces are created through the frangible member to limit bending and prevent breaking.

11 Claims, 2 Drawing Figures

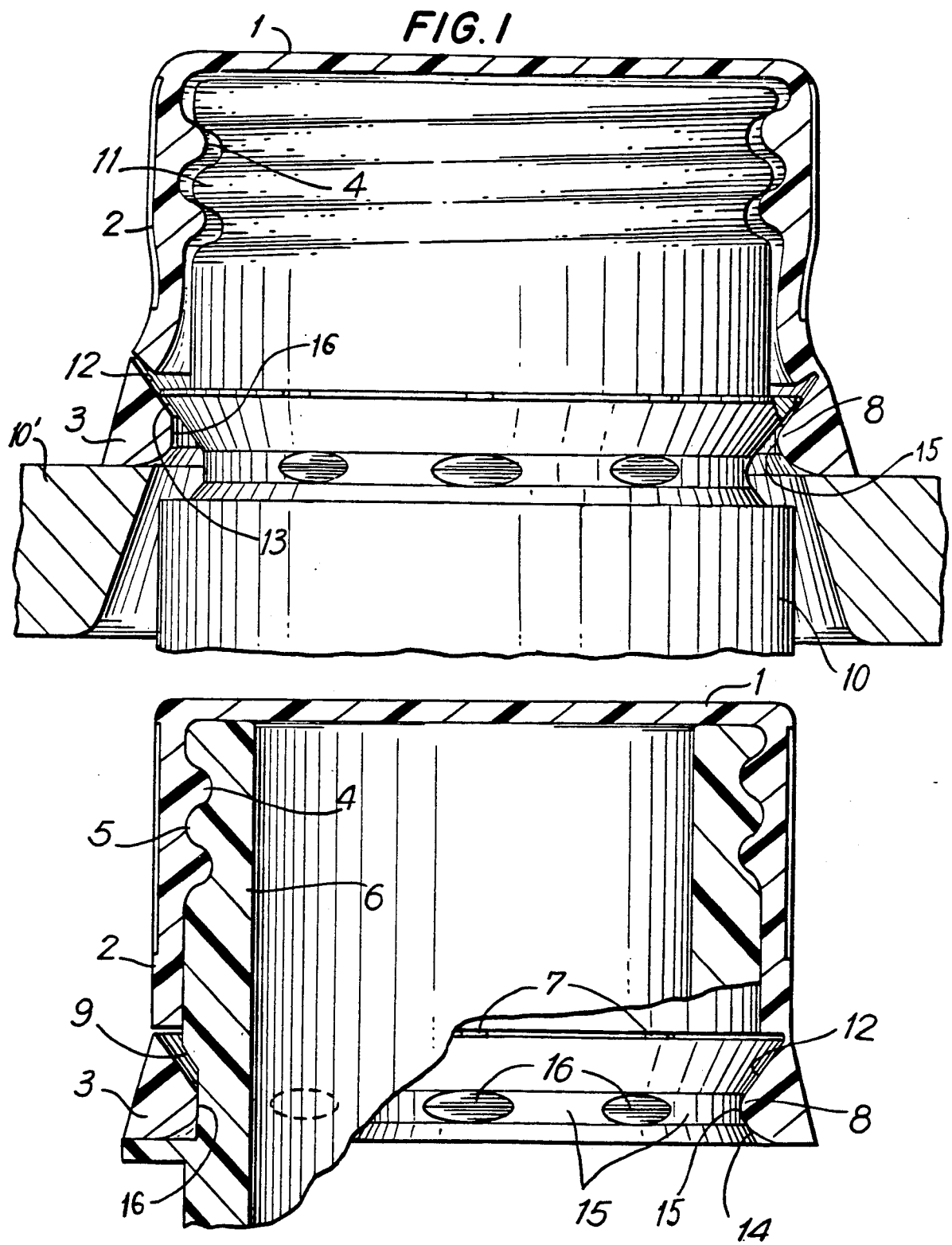

PILFER-PROOF CAP

BACKGROUND OF THE INVENTION

The present invention relates to an improved cap for use with containers whereby removal of the cap leaves behind a telltale ring member. There are presently available many pilfer-proof closure or cap constructions of this type. Generally, they are constructed with a threaded skirt portion extending downwardly from the top wall of the cap and a pilfer-proof ring member attached to the lower end of the skirt. The ring is attached by frangible members which break upon unthreading of the cap from the container due to engagement of the ring member below a protruding ledge or shoulder on the container.

With metal closures, the formation of the pilfer-proof ring is typically effected after the closure has been placed onto the container. More particularly, the pilfer-proof ring is secured under a cooperating shoulder on the container neck by a rolling operation. With the advent of molded plastic caps, the pilfer-proof ring portion of the cap is performed as part of the initial molding of the cap. This presents some problems with respect to structuring the pilfer-proof ring and frangible members so that the cap can be threaded onto the container without breaking the frangible members. If breakage occurs, the ring is obviously of no value for use as an indicator of tampering with or removal of the closure.

The molding of plastic caps with pilfer-proof rings also presents some problems. The molding operation requires an internal die member for shaping the internal surface of the cap. This die member has external threads just like the bottle with which the cap is to be used. This thread structure and other portions of the die required for forming the pilfer-proof ring can interfere with removal of the cap by obstructing the ring and causing it to break away just as if the cap were being unthreaded from the container.

Attempts have been made to design plastic caps to overcome the problems associated with molding and applying the cap to the container. My prior patent, U.S. Pat. No. 4,322,012 discloses a molded plastic pilfer-proof cap in which the pilfer-proof ring is attached to the skirt by frangible members and constructed internally with locking members having the appropriate camming surface to permit threading of the cap to the container without breaking of the frangible members. Molding of this type of cap construction, however, typically requires a collapsible inner die member.

U.S. Pat. No. 4,147,268 also discloses a molded plastic pilfer-proof cap. In this cap the pilfer-proof ring is constructed with internally protruding locking members which extend at an angle so as to permit the cap to be removed from the internal die member by unthreading. This same structure permits the cap to be threaded onto the container. In addition, the locking members are provided with camming surfaces to permit sliding over the locking shoulder of the container as the cap is fully threaded onto the container.

SUMMARY OF THE INVENTION

The pilfer-proof cap constructed in accordance with the teachings of the present invention includes a pilfer-proof ring which is structured and connected to the skirt portion of the cap in such a manner as to readily permit its removal from the internal molding die and subsequent attachment to the container. More particularly, the pilfer-proof ring is constructed with an inwardly protruding locking means for engagement under a cooperating shoulder on the neck of the container to which it is applied. The frangible means which connects the pilfer-proof ring to the lower end of the skirt portion of the cap is axially aligned with both the skirt and the pilfer-proof ring.

With the above construction, the molded cap can be removed from the internal die structure used in the cap molding operation by axially pushing on the bottom of the pilfer-proof ring. The axial alignment of the frangible members with the skirt and ring together with their thickness provide enough axial rigidity to prevent the pilfer-proof ring from unduly flexing relative to the skirt portion of the cap during this removal operation. The entire wall structure of the cap simply expands more or less as an integral unit. Thus, breaking of the frangible members is avoided. This same feature is also useful during attaching the cap to the container. As the cap is threaded down onto the neck of the container, the bottom of the pilfer-proof ring engages against the threads and creates an axial compression of the ring toward the overlying skirt. This holds the ring, frangible members and skirt together in compression as an integral unit and permits them to expand without such severe flexing of the ring relative to the skirt which would cause breaking of the frangible members. The bottom surface of the protruding locking means on the pilfer-proof ring is also structured to readily permit this expansion of the ring over the threaded portion of the neck of the container.

BRIEF DESCRIPTION OF THE DRAWINGS

FIG. 1 is an enlarged cross-section view of the cap of the present invention showing part of the internal mold structure on which it is molded and with the cap partially removed therefrom; and FIG. 2 is an enlarged cross-sectional view, partly broken away, showing the cap of the present invention as attached to a container.

DESCRIPTION OF THE PREFERRED EMBODIMENT

The cap of the present invention generally includes a top wall 1, a depending side wall or skirt 2 and the improved pilfer-proof ring 3 attached to the bottom end of the skirt. The internal wall surface of the skirt includes a threaded portion 4 adapted to mate with complementary threads 5 on the neck 6 of a container such as shown in FIG. 2.

The pilfer-proof ring 3 is connected to the skirt portion of the cap by separate frangible members 7 and includes a radially inwardly extending locking means in the form of an inwardly directed protrusion 8 extending completely around the inner periphery of the ring. The locking means is adapted to slide over a shoulder 9 on the outside surface of the container neck as the cap is threaded onto the container. With the cap fully threaded onto the container, the locking means is positioned under the shoulder 9 so that upon unthreading of the cap, upward movement of the pilfer-proof ring will be blocked thereby. The frangible members 7 connecting the ring to the skirt are constructed so that they will break away as the ring engages the shoulder 9. This puts the members 7 in tension and at the same time causes the ring to expand outwardly, in turn, causing flexing of the members. The combined pulling and flexing of the frangible members causes their breaking.

In accordance with the teachings of the present invention, the frangible members 7 are axially aligned with both the skirt and ring portions of the cap adjacent the outside surface of the skirt. They also are constructed with a sufficient cross-sectional dimension so as to provide axial rigidity between the skirt and the ring upon subjecting the ring to an axial compressive force directed toward the skirt. This construction facilitates removal of the molded cap from the internal die member 10 on which it is formed. Removal is effected by pushing the cap off the internal die member by a stripper ring 10'. The pushing force is exerted against the bottom of the pilfer-proof ring as indicated in FIG. 1. Due to the axial alignment of the frangible members 7 with both the ring and skirt and also due to the cross-section thickness of the frangible members, the force exerted on the bottom of the ring puts the members in compression. The pushing force is directed in a generally straight line through the ring, frangible members and skirt with the result that there is little bending moment created.

The cap generally expands radially outwardly as it is removed from the internal die member 10. Partial removal of the cap from the die member is shown in FIG. 1. There it is seen that the internal thread 4 of the cap as it engages against the external thread 11 on the die member 10 effects a camming of the skirt portion of the cap radially outwardly of the die member. The skirt actually expands as it is cammed over the die threads. At the same time the upper surface 12 of the locking protrusion 8 on the pilfer-proof ring engages against the complementary shaped wall surface 13 of the internal die member. This engagement effects a camming of the ring in a radially outwardly direction to cause it to expand at the same time the skirt is being cammed and expanded radially outwardly.

Due to the location of the frangible members and the rigidity provided by their cross-sectional thickness, the skirt and ring expand more or less as an integral unit without flexing of the ring relative to the skirt to an extent which would cause breaking of the frangible members. Removal of the molded cap from the internal die member can therefore be accomplished with a simple pushing operation. Complicated collapsible die structure is not required.

In the preferred embodiment of the present invention the inwardly directed protrusion 8 of the locking portion of the pilfer-proof ring has an axial cross-section which is generally conical in shape. That is, this cross section of protrusion 8 has a shape generally similar to the shape of an axial cross section of a solid cone. The upper surface 12 of this protrusion is a straight surface; and as shown in FIG. 2, this surface is disposed at an angle about equal to the angle at which the shoulder 9 of the container extends. The bottom surface of the protrusion has an axially downwardly facing convex surface 14. These surfaces facilitate connection of the cap to the container and retention of the ring on the container upon removal of the cap. More particularly, the flat surface 12 engages against the complementary shaped surface of the shoulder 9 whereby axial unthreading of the cap produces a pulling effect on the ring and the frangible members to put them in tension. The tensioning or pulling on the frangible members together with their simultaneous flexing as the ring is cammed outwardly over the shoulder 9 of the bottle causes the frangible members to break.

The convex shape of the bottom surface 14 of the protrusion 8 of the pilfer-proof ring assists in camming the ring over the threads 5 of the container neck as the cap is threaded onto the container. Again, engagement of the bottom of the ring against the threads produces some compressive force through the ring, frangible members and skirt coupling these members together as an integral unit to thereby prevent undue flexing of the ring relative to the skirt. And without any simultaneous pulling of the frangible members as occurs upon removing the cap from the container, they do not break.

As shown in FIGS. 1 and 2, the radially inwardly most surface of the protrusion 8 of the pilfer-proof ring is provided with multiple circumferentially spaced areas 15 disposed radially outwardly of the remainder of this surface. Although these areas 15 are located radially outwardly of the innermost extent of the protrusion, they will, nevertheless, be located under the shoulder 9 of the container when the cap is fully threaded onto the container. This is shown in FIG. 2. Accordingly, engagement of the upper surface 12 of the protrusion with the shoulder 9 occurs at all points around the pilfer-proof ring.

In the preferred embodiment, the circumferentially spaced areas are curved to define radially inwardly facing curved portions and they are evenly spaced from each other. Together they extend over one-half of the inner periphery of the protrusion 8. There are eight such areas spaced about the internal periphery and each area covers a circumferential distance of about $22\frac{1}{2}°$. The remainder of the inner surface of the protrusion 8 is formed as flats 16. These flats define chordal portions, spaced between the curved portions of the protrusion, and are aligned with the frangible members 7.

I claim:

1. The improvement in a plastic pilfer-proof cap molded on an internal mold member and adapted for use with a container having a threaded neck portion and a radially inwardly extending shoulder disposed below the threaded neck portion and facing axially away therefrom, the cap having a top wall, a depending skirt with internal threading for engagement with the threaded neck portion of the container and a pilfer-proof ring connected to the lower end of the skirt by fragible means and having radially inwardly extending locking means adapted to slide over the shoulder upon threading the cap onto the container and to engage against the shoulder upon unthreading of the cap to cause the frangible means to break and the ring to separate from the skirt of the cap, the improvement wherein:
   a) the frangible means is aligned axially with the skirt and ring;
   b) the locking means includes a radially inwardly directed protrusion extending around the internal periphery of the ring; and
   c) the protrusion, in axial cross-section, has a generally conical shape with the radially inwardly facing surface having multiple circumferentially spaced areas disposed radially outwardly of remainder of said surface, said areas each defining a radially inwardly facing curved portion and the remainder of said surface defining chordal portions.

2. The improvement in the cap according to claim 1 wherein:

(a) the circumferentially spaced areas are positioned for location under the shoulder of the container when the cap is fully threaded onto the container.

3. The improvement in the cap according to claim 2 wherein:
   (a) the circumferentially spaced areas are evenly spaced from each other and together cover one-half of the inner surface of the locking means.

4. The improvement in the cap according to claim 3 wherein:
   (a) there are eight circumferentially spaced areas.

5. The improvement in the cap according to any one of claims 1, 2, 3 or 4 wherein:
   (a) the frangible means includes separate members each one of which is axially aligned with one of the chordal portions of the locking means.

6. The improvement in the cap according to claim 5 wherein:
   (a) each of the frangible members:
      (1) has a thickness less than the thickness of the skirt, and
      (2) is positioned adjacent the outer surface of the skirt.

7. The improvement in the cap according to claim 6 wherein:
   (a) the protrusion of the locking means has an axially upwardly facing straight surface disposed at an angle about equal to the angle at which the shoulder of the container extends.

8. The improvement in the cap according to claim 7 wherein:
   (a) the protrusion of the locking means has an axially downwardly facing convex surface.

9. The improvement in a plastic pilfer-proof cap molded on an internal mold member and adapted for use with a container having a threaded neck portion and a radially inwardly extending shoulder disposed below the threaded neck portion and facing axially away therefrom, the cap having a top wall, a depending skirt with internal threading for engagement with the threaded neck portion of the container and a pilfer-proof ring connected to the lower end of the skirt by frangible means and having radially inwardly extending locking means adapted to slide over the shoulder upon threading the cap onto the container and to engage against the shoulder upon unthreading of the cap to cause the frangible means to break and the ring to separate from the skirt of the cap, the improvement wherein:
   (a) the frangible means is aligned axially with the skirt and ring;
   (b) the locking means includes a radially inwardly directed protrusion extending around the internal periphery of the ring, the protrusion having a radially inwardly facing surface and multiple circumferentially spaced areas disposed radially outwardly of the remainder of said surface.

10. The improvement in the cap according to claim 9 wherein:
    (a) the frangible means includes separate members positioned between said multiple circumferentially spaced areas.

11. The improvement according to any one of claims 1, 9 or 10 wherein:
    (a) the frangible means includes separate members each having a thickness less than the thickness of the skirt and an outer surface axially aligned with the outermost surface of both the skirt and ring.

* * * * *